Oct. 9, 1956     L. F. SHAW     2,765,630
REFRIGERATOR AIR TEMPERATURE CONTROL DEVICE
Filed June 17, 1955
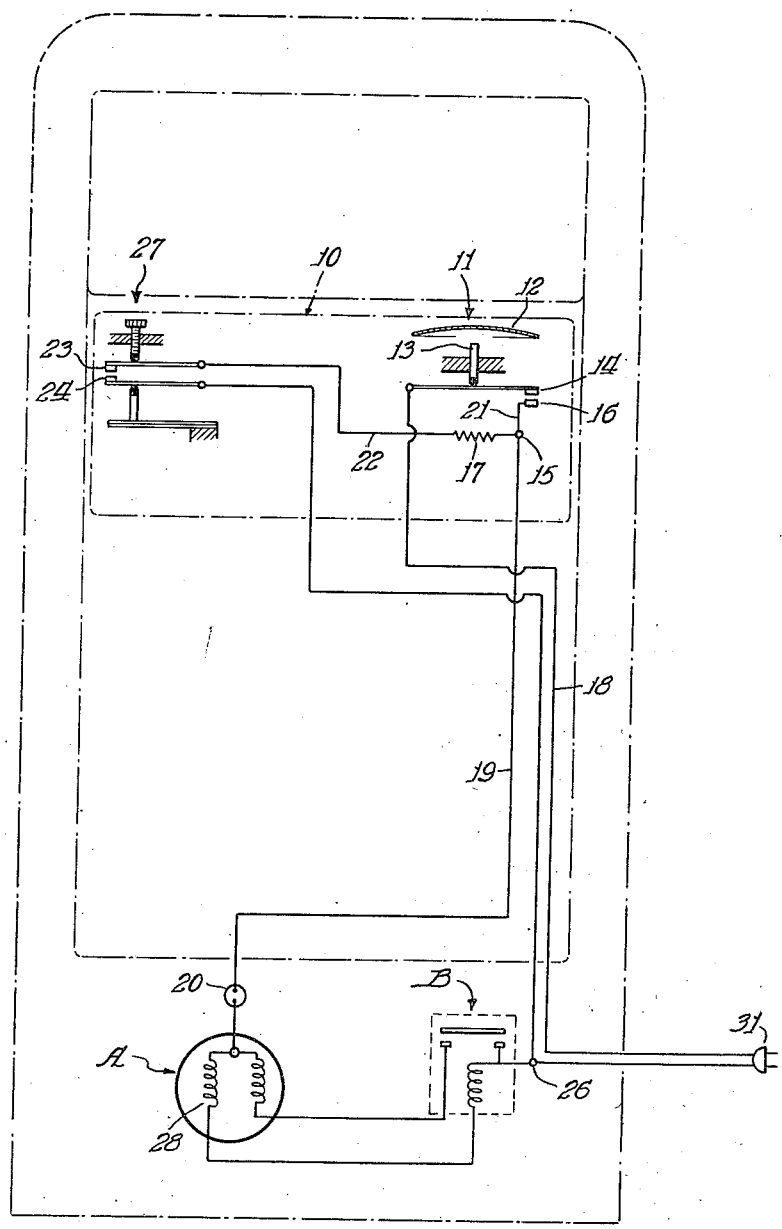
Inventor:
Lyle F. Shaw
By: Joseph M. Gartner
Atty.

United States Patent Office 2,765,630
Patented Oct. 9, 1956

2,765,630

REFRIGERATOR AIR TEMPERATURE CONTROL DEVICE

Lyle F. Shaw, Muskegon, Mich., assignor to Borg-Warner Corporation, Chicago, Ill., a corporation of Illinois Application June 17, 1955, Serial No. 516,265

5 Claims. (Cl. 62—4)

This invention relates to refrigerators of the type composed of a single freezing compartment or to those having a storage compartment for preserving perishables in an unfrozen condition in addition to a freezing compartment.

More specifically, the invention relates to temperature control devices for refrigerators of the above general class.

As is well known, each time a refrigerator access door is opened there is introduced into the refrigerator a draft of relatively warm room temperature air which tends to increase the air temperature within the particular compartment so exposed.

In order to maintain a refrigerated compartment at a desired temperature level, or at least within a desired temperature range, thermostatic control devices have been mounted in the compartment to be regulated. These devices are operative in one manner or another to energize the refrigerant compressor motor, to initiate the refrigerant cycle, thus maintaining the compartment at the desired temperature.

Heretofore such control devices have been so arranged with respect to the means for cooling a particular compartment that in order to reduce the temperature of the compartment to a desired low level it is frequently necessary to operate the compressor through a plurality of cycles. For example, a temperature responsive switch mounted adjacent a compartment cooling means is ordinarily set to close a switch at a pre-determined high temperature and to open the switch at a pre-determined low temperature. Such a switch is necessarily under the influence of the temperature of the air immediately surrounding the switch and the cooling means while the temperature of the air in certain remote regions of a particular refrigerator compartment has very little direct influence upon the switch.

Consequently, when the air temperature of a refrigerator compartment rises above a pre-determined level as a result of the admission of room temperature air therein, the thermostatic switch adjacent the cooling means operates to energize the compressor motor to cool the compartment. It is readily apparent that as soon as the air immediately surrounding the switch and the cooling means is cooled to the desired low temperature level the switch operates to de-energize the compressor motor. It is further apparent that there are pockets of warm air located in remote regions of the compartment which have not yet been reduced to the desired low temperature level. Ultimately, this warmer air is effective to equalize the air temperature throughout the compartment including that area occupied by the thermostatic switch with the result that the switch is actuated to energize the compressor motor. Operation of the compressor motor again develops localized cooling in the vicinity of the switch and the cooling means with the result that the compressor is stopped again without having satisfied the temperature requirements of the remainder of the compartment.

This cyclic operation continues until the air temperature within the complete compartment is finally equalized at a point which is within the desired temperature range.

It has been found that temperature control devices of the above character require extended intermittent operation of the refrigerant compressor in order to recover cooling effect lost after the admission of room temperature air. It has also been found that control devices which are effective to operate the compressor motor for a sustained interval and until all areas of a particular compartment have been reduced to a desired low temperature level accomplish the task in a much shorter interval as against the time required by intermittent operation. Obviously, quick recovery of the desired compartment air temperature results in increased safety against food spoilage. Rapid air temperature recovery is a special feature of the present invention.

Accordingly, it is a particular object of the present invention to provide a refrigerator air temperature control device operative to cause the refrigerant compressor to remain in operation continuously until the air temperature of a particular compartment of the refrigerator has been reduced to a desired low level.

Another object of the present invention is the provision of a refrigerator air temperature control device having a first thermostatic switch operative in response to a pre-determined high temperature to start up the refrigerant compressor and having at least one secondary thermostatic switch for controlling the de-energization of the compressor motor after a pre-determined low air temperature has been reached.

A control device embodying certain features of the present invention may include a refrigerator having a storage compartment therein, means for cooling the compartment, a first thermostatic switch located adjacent the cooling means and operative in response to a predetermined high temperature to actuate the cooling means; said first thermostatic switch being operative in response to a pre-determined low temperature for rendering said cooling means inoperative; at least one other thermostatic switch remotely located with respect to said first switch and having means for precluding the operation of said first switch even though said pre-determined low temperature has been reached.

The above objects and features of the present invention will become more apparent from the following specification and drawings wherein the figure is a wiring diagram of one embodiment of the present invention showing certain portions of a conventional refrigerating apparatus.

Referring now to the figure there is shown an evaporator plate 10 having a thermostatic switch 11 mounted thereon. This thermostatic switch may be of any suitable type; the one shown in the figure being the disc type having a diaphragm 12 which dimples inwardly and outwardly in response to temperature changes to actuate a pin 13 which, in turn, controls the opening and the closure of contacts 14 and 16. The contact 14 is connected to one side of a 110 volt power supply by means of the lead 18. The contact 16 is connected by means of the lead 21 to the junction 15 and thence by means of a lead 19 to a motor overloaded protector 20. One side of a heating element 17 is connected to the junction 15 while the other end of the heating element 17 is connected by means of the lead 22 to a contact 23. A contact 24 is connected to the junction 26 and thence to the other side of the 110 volt power supply.

The contacts 23 and 24 are part of a thermostatic switch indicated generally at 27. The thermostatic switch 27 may be of any suitable design. It is to be particularly noted that the switch 27 is located remotely with respect to the switch 11 and is so disposed within the food storage compartment so as to be influenced by air having the greatest differential temperature as against the temperature of the air immediately surrounding the thermostatic switch 11.

A preferred location for the switch 27 is in the upper regions of a refrigerated compartment for the obvious reason that it is in these areas that warm air will accumulate.

Since it is not intended that the control device embodying the present invention be restricted to any particular form of refrigeration but may be used on any style refrigerator and/or freezer commercially available on the market, it is sufficient to state that a machine utilizing the present invention may include a compressor motor such as indicated generally at A, having an overload protector 20 and a starting relay B. The only portion of the refrigerant system, per se, shown is the evaporator 10.

One side of the main winding 28 of the refrigerator motor A is connected to the overload protector 20 while the other side is connected to the junction 26 through motor starting relay B.

In an exemplary embodiment of the present invention the thermostatic switch 11 is set to close the contacts 14 and 16 when the temperature of air, immediately surrounding the switch, rises to 36½ degrees Fahrenheit and is set to open the contacts when the temperature drops to 5 degrees Fahrenheit. The switch 27 is set to close the contacts 23 and 24 when the surrounding air rises above 38 degrees Fahrenheit, and is set to open these contacts when the air temperature is reduced below 38 degrees Fahrenheit. It is to be distinctly understood that the above temperatures are being used primarily for the purpose of description and it is not intended that the invention be restricted thereto. Obviously, the two thermostats may be set to any desired temperature depending whether the control device is being utilized in a refrigerator operable solely as a freezer or in the food storage compartment of a refrigerator composed of both a food storage compartment and a freezing compartment.

The operation of the above-described control device is as follows:

Assume that the thermostatic switches 11 and 27 are set to operate at the temperature levels described above, and that the air temperature throughout the storage compartment to be cooled is 50 degrees Fahrenheit. Upon energizing the compressor motor A, by inserting the male electrical connection 31 into a 110 volt outlet, the refrigerator compressor will be operated to cool the evaporator 10. This is so because at 50 degrees Fahrenheit the contacts 14 and 16 and the contacts 23 and 24 will be closed thus completing the circuit to the compressor motor. Since the thermostatic switch 27 is in circuit with the heating element 17, the element will be energized. Operation of the compressor motor A will continue to supply refrigerant to the evaporator 10 thus cooling the storage compartment within which the control device is housed. The temperature of the air, immediately surrounding the thermostatic switch 11, will gradually be reduced until the temperature therearound falls below 5 degrees Fahrenheit (the point at which contacts 14 and 16 are set to open). However, at this time there are other regions of the storage compartment which have not yet been reduced below 35 degrees Fahrenheit (the temperature at which the thermostatic switch 27 is set to open) and this fact is evidenced by the failure of the contacts 23 and 24 to open. Accordingly, the heating element 17 is effective to maintain the air surrounding the disc type thermostat sufficiently warm to preclude breaking the electrical connection between the contacts 14 and 16 until the temperature of the air surrounding the thermostatic switch 27 (located in the warmest part of the compartment) has been reduced to the desired level. When the thermostatic switch 27 has been satisfied the contacts 23 and 24 are open and the electrical circuit to the heating element 17 is broken with the result that the evaporator 10 is permitted to reduce the air temperature surrounding the switch 11 immediately allowing the contacts 14 and 16 to open, thus de-energizing the compressor motor to shut down the refrigerant cycle.

It is to be noted that when the control device is utilized in refrigerators having both a food freezing compartment and a food storing compartment the thermostatic switches 11 and 27 may be located in either compartment. On the other hand, in refrigerators composed solely of a food freezing compartment or solely of a food storage compartment, the thermostatic switches 11 and 27 are disposed in the single compartment.

From the above description and operation of the present invention it is apparent that a control device has been provided which is operative to preclude cyclic or intermittent operation of the compressor motor until a particular refrigerated compartment has been uniformly brought to the desired low temperature. It is to be particularly noted that the thermostatic switch 11 controls the starting of the refrigerant cycle by virtue of its association with the plate 10 while the thermostatic switch 27 controls the stopping of the refrigerant cycle after its temperature requirements have been satisfied.

It is anticipated that various arrangements of the present invention may be undertaken without departing from the spirit and scope of the appended claims and it is not intended that the system herein disclosed be restricted to the particular thermostatic switches disclosed.

I claim:

1. In a refrigerator including a refrigerated compartment and an electric compressor motor operative to supply refrigerant to an evaporator in said compartment and including an electrical control circuit for starting and stopping the motor, control devices in said electrical circuit comprising: a first temperature responsive switch mounted adjacent the evaporator, directly responsive to evaporator temperatures, and operable to de-energize the motor at a predetermined low evaporator temperature; a heating means in the electrical circuit mounted adjacent the first switch for directly influencing the operation of the switch; and a second temperature responsive switch in the electrical circuit located in said compartment and responsive to a local compartment temperature but not to the evaporator temperatures and effective to control the operation of the heating means to influence the first switch whereby the compressor motor is maintained operative even though said predetermined low evaporator temperature has been reached.

2. A device for controlling air temperature within a food storage compartment of a household refrigerator, said compartment having pockets of warm air therein, comprising means including an evaporator and a compressor motor for refrigerating the compartment generally; a first thermostatic switch positioned in said compartment directly responsive to the temperature of the evaporator and operable to control the compressor motor; a heater in said compartment and adapted to influence the operation of the first switch; a second thermostatic switch positioned within said compartment and disposed in the region of one of said pockets of warm air; said second switch being responsive to the temperature of said warm air and operable to energize the heater whereby the first switch is precluded from responding to the temperature of the evaporator.

3. In a refrigerator including a refrigerated compartment and an electric compressor motor operative to supply refrigerant to an evaporator in said compartment and including an electrical control circuit for starting and stopping the motor, control devices in said electrical circuit comprising: a first temperature responsive switch disposed in said compartment, directly responsive to evaporator temperatures and operable to energize the motor at a predetermined high evaporator temperature and to de-energize the motor at a predetermined low evaporator temperature; a heating means in the electrical circuit mounted adjacent the first switch for directly influencing the operation of the switch; and a second temperature responsive switch in the electrical circuit located in said compartment and responsive to a local compartment temperature but not to the evaporator temperatures and effective to energize the heating means whereby the first switch is warmed and the compressor motor is maintained operative even though said predetermined low evaporator temperature has been reached.

4. In a refrigerator having at least one compartment for storing material to be refrigerated and having an evaporator in said compartment for refrigerating air contained therein, a cold control device comprising: a means for cooling the evaporator, and including an electric compressor motor, a first thermostatic switch disposed in the compartment and operative in response to a predetermined low evaporator temperature to render the motor inoperative; a heater associated with the first switch and operable to heat said switch and a localized portion of said evaporator; and a second thermostatic switch disposed in the compartment for operating said heater whereby said cooling means is maintained operative even though said evaporator generally has been cooled below said predetermined temperature.

5. In a refrigerator having at least one compartment for storing perishables and having an evaporator in said compartment for refrigerating air contained therein, a cold control device comprising: means for cooling the evaporator; a first thermostatic switch mounted upon the evaporator at a predetermined location, said first switch being under the influence of the temperature of said evaporator and operative in response to a first predetermined low temperature to render the cooling means inoperative; a heater incorporated in said switch and operable to maintain the temperature of said switch above said predetermined temperature whereby said cooling means remains operative, even though the temperature of said evaporator generally falls below said predetermined temperature, and a second thermostatic switch located remotely with respect to the first switch and operable in response to a second predetermined low temperature to render said heater inoperative whereby the predetermined location of the evaporator is permitted to fall below said first predetermined temperature thus rendering the cooling means inoperative.

References Cited in the file of this patent

UNITED STATES PATENTS

| | | |
|---|---|---|
| 1,705,690 | Thomas | Mar. 19, 1929 |
| 2,133,959 | Buchanan | Oct. 25, 1938 |
| 2,389,073 | Newton | Nov. 13, 1945 |
| 2,519,006 | Thompson | Aug. 15, 1950 |
| 2,531,136 | Kurtz | Nov. 21, 1950 |